United States Patent
Peters et al.

(10) Patent No.: US 10,757,367 B1
(45) Date of Patent: *Aug. 25, 2020

(54) ENHANCED VIDEO CONFERENCE MANAGEMENT

(71) Applicant: Michael H. Peters, Knoxville, TN (US)

(72) Inventors: Michael H. Peters, Knoxville, TN (US); Alexander M. Stufflebeam, Indianapolis, IN (US)

(73) Assignee: Michael H. Peters, Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/516,731

(22) Filed: Jul. 19, 2019

Related U.S. Application Data

(63) Continuation of application No. 16/128,137, filed on Sep. 11, 2018, now Pat. No. 10,382,722.

(60) Provisional application No. 62/556,672, filed on Sep. 11, 2017.

(51) Int. Cl.
    *H04N 7/15*       (2006.01)
    *G06K 9/00*      (2006.01)

(52) U.S. Cl.
    CPC ......... *H04N 7/152* (2013.01); *G06K 9/00718* (2013.01)

(58) Field of Classification Search
    CPC H04N 7/15; H04N 7/152; H04N 7/14; H04N 7/147; G06K 9/00
    USPC .......................................... 348/14.01–14.16
    See application file for complete search history.

(56) References Cited

U.S. PATENT DOCUMENTS

| | | | |
|---|---|---|---|
| 5,528,289 A | 6/1996 | Cortjens et al. | |
| 6,894,714 B2 | 5/2005 | Gutta et al. | |
| 7,953,219 B2 | 5/2011 | Freedman | |
| 8,754,926 B1 * | 6/2014 | Gossweiler | H04L 12/1827 348/14.08 |

(Continued)

FOREIGN PATENT DOCUMENTS

| | | |
|---|---|---|
| EP | 2509006 | 10/2012 |

OTHER PUBLICATIONS

Chickerur, Satyadhyan, and Joshi, Kartik, "3D Face Model Dataset: Automatic Detection of Facial Expressions and Emotions for Educational Environments," British Journal of Educational Technology, vol. 46, No. 5, 2015, 1028-1037.

(Continued)

*Primary Examiner* — Melur Ramakrishnaiah
(74) *Attorney, Agent, or Firm* — Fish & Richardson P.C.

(57) ABSTRACT

Methods, systems, and apparatus, including computer programs encoded on a computer storage medium, for enhanced video conference management. In some implementations, a media stream is received from each of multiple endpoint devices over a communication network. A video conference session among the endpoint devices is managed such that at least one or more of the media streams are transmitted over the communication network for display by the endpoint devices. A plurality of audio and/or video characteristics from the media stream from a particular endpoint device of the multiple endpoint devices are measured. Based on the audio and/or video characteristics, a collaboration factor score is determined for the particular endpoint device for each of a plurality of collaboration factors. The video conference of the endpoint devices by performing a video conference management action selected based on the collaboration factor scores.

20 Claims, 9 Drawing Sheets

(56) References Cited

U.S. PATENT DOCUMENTS

| | | | |
|---|---|---|---|
| 1,009,631 A1 | 10/2018 | Jin | |
| 10,524,715 B2 | 1/2020 | Sahin | |
| 2006/0244818 A1 | 11/2006 | Majors et al. | |
| 2009/0015659 A1 | 1/2009 | Choi | |
| 2009/0204906 A1 | 8/2009 | Irving | |
| 2011/0295392 A1 | 12/2011 | Cunnington et al. | |
| 2012/0002001 A1* | 1/2012 | Prentice | H04N 7/147 348/14.08 |
| 2012/0147123 A1* | 6/2012 | Lian | H04N 7/15 348/14.03 |
| 2012/0218373 A1* | 8/2012 | N'guessan | H04N 7/15 348/14.08 |
| 2014/0022370 A1 | 1/2014 | Sohn et al. | |
| 2014/0112556 A1 | 4/2014 | Kalinli-Akbacak | |
| 2014/0223462 A1 | 8/2014 | Aimone et al. | |
| 2014/0354759 A1* | 12/2014 | Cranfill | H04N 7/147 348/14.1 |
| 2015/0127346 A1* | 5/2015 | Gruenstein | G10L 15/08 704/254 |
| 2016/0360150 A1* | 12/2016 | Onno | H04N 7/142 |
| 2017/0161683 A1* | 6/2017 | Allan | G06F 16/245 |
| 2017/0177928 A1* | 6/2017 | Cunico | H04N 7/147 |

OTHER PUBLICATIONS

Miller, Frederick A., and Katz, Judith H., "4 Keys to Accelerating Collaboration," OD Practitioner, vol. 46, No. 1, 2014.
Meier, A., et al., "A Rating Scheme for Assessing the Quality of Computer-Supported Collaboration Processes," Computer-Supported Collaborative Learning (2007), 2:63-86.
Goman, Carol Kinsey, "Body Language: 10 Simple and Powerful Tips," Sales and Service Excellence, Mar. 2013.
Al Shaqsi, Jamil, and Wang, Wenjia, "Estimating the Predominant Number of Clusters in a Dataset," Intelligent Data Analysis 17 (2013)603-626.
Meilâ, Marina, and Heckerman, David, "An Experimental Comparison of Model-Based Clustering Methods," Machine Learning, 42, 9-29, 2001.
Anaya, Antonio R., and Boticario, Jesus G., "A Data Mining Approach to Reveal Representative Collaboration Indicators in Open Collaboration Frameworks," Educational Data Mining, 2009.
Schneider, Bertrand, and Pea, Roy, "Real-Time Mutual Gaze Perception Enhances Collaborative Learning and Collaboration Quality," Computer-Supported Collaborative Learning, accepted Sep. 17, 2013.
Hara, N., et al., "An Emerging View of Scientific Collaboration: Scientists' Perspectives on Collaboration and Factors that Impact Collaboration," Journal of the American Society for Information Science and Technology, 54(10):952-965, 2003.
Tobin White, "Student Participation in Math Discourse with Networked Handhelds," Computer-Supported Collaborative Learning, revised Jun. 29, 2005, accepted Jun. 30, 2006.
Jacques Lonchamp, Supporting Synchronous Collaborative Learning: A Generic, Multi-Dimensional Model, Computer-Supported Learnings, © International Society of the Learning Sciences, Inc., Springer Science + Business Media, Inc. 2006.
Porcaro, David, and Carrier, Carol, "Ten Guiding Principles for Designing Online Modules that Involve International Collaborations," International Journal of Education and Development Using Information and Communication Technology (IJEDICT), 2014, vol. 10, Issue 2, pp. 142-150.
Andres, H.P., and Shipps, B.P., "Team Learning in Technology-Mediated Distributed Teams," Journal of Information Systems Education, vol. 21(2), Summer 2010.
Carol Kinsey Goman, "What's So Great about Face to Face?", Communication World, May-Jun. 2011.

* cited by examiner

ENHANCED VIDEO CONFERENCE MANAGEMENT

CROSS-REFERENCE TO RELATED APPLICATION

This application is a continuation of U.S. patent application Ser. No. 16/128,137, filed Sep. 11, 2018, now allowed, which claims the benefit of U.S. Provisional Patent Application Ser. No. 62/556,672, filed Sep. 11, 2017. The entire contents of the prior applications are incorporated by reference.

BACKGROUND

The present specification relates to managing video conferences. As communications networks have become more reliable, video conferences have become increasingly popular.

SUMMARY

In some implementations, a system can manage and enhance multi-party video conferences to improve performance of the conference and increase collaboration. The techniques can be implemented using one or more computers, e.g., server systems, and/or application(s) operating on various devices in a conference. In general, the system can monitor media streams from different endpoint devices connected to the conference, and enhance the video conference in various ways. As discussed further below, the enhancements can alter the manner in which media streams are transferred over a network, which can reduce bandwidth usage and increase efficiency of the conference. The manner in which the various endpoints in a conference present the conference can also be adjusted. For example, the system can provide an automated moderator module that can actively make changes to the way media streams are transmitted and presented, based on collaboration factor scores determined through real-time analysis of the video streams. The system can also provide feedback regarding participation based on principles of neuroscience, and can adjust parameters of the video conference session based on those factors. The moderator system can operate in different modes to actively alter or enhance a video conference session directly, or to provide recommendations to one or more devices so that another device or a user can make changes.

Video conferencing comprises the technologies for the reception and transmission of audio and video signals by devices (e.g., endpoints) of users at different locations, for communication in real-time, simulating a collaborative, proximate setting. The principal drive behind the evolution of video conferencing technology has been the need to facilitate collaboration of two or more people or organizations to work together to realize shared goals and to achieve objectives. Teams that work collaboratively can obtain greater resources, recognition and reward when facing competition for finite resources.

For example, mobile collaboration systems combine the use of video, audio, and on-screen drawing capabilities using the latest generation hand-held electronic devices broadcasting over secure networks, enabling multi-party conferencing in real-time, independent of location. Mobile collaboration systems are frequently being used in industries such as manufacturing, energy, healthcare, insurance, government and public safety. Live, visual interaction removes traditional restrictions of distance and time, often in locations previously unreachable, such as a manufacturing plant floor a continent away.

Video conferencing has also been called "visual collaboration" and is a type of groupware or collaborative software which is designed to help people involved in a common task to achieve their goals. The use of collaborative software in the school or workspace creates a collaborative working environment. Collaborative software or groupware can to transform the way participants share information, documents, rich media, etc. in order to enable more effective team collaboration. Video conferencing technology can be used in conjunction with mobile devices, desktop web cams, and other systems to enable low-cost face-to-face business meetings without leaving the desk, especially for businesses with widespread offices.

Although video conferencing has frequently proven immensely valuable, research has shown that participants must work harder to actively participate as well as accurately interpret information delivered during a conference than they would if they attended face-to-face, particularly due to misunderstandings and miscommunication that are unintentionally interjected in the depersonalized video conference setting.

When collaborative groups are formed in order to achieve an objective by way of video conferencing, participants within the group may tend to be uncomfortable, uneasy, even have anxiety from the outset and particularly throughout the meeting due to misunderstandings and feelings stemming from barriers influenced and created by negative neurological hormones. Moreover, remote video conferencing is plagued by obstacles of disinterest, fatigue, domineering people, and distractions and each person's remote environment and personal distractions and feelings. Whereas, in a venue where everyone is physically present, the tendencies to be distracted, mute the audio for separate conversations, use other electronic devices, or to dominate the conversation or hide are greatly reduced due to physical presence of other participants.

To address the challenges presented by typical video conferencing systems, the systems discussed herein include capabilities to detect different conditions during a video conference and take a variety of video conference management actions to improve the video conference session. Some of the conditions that are detected can be attributes of participants as observed through the media streams in the conference. For example, the system can use image recognition and gesture recognition to identify different facial expressions. The system can also evaluate audio, for example assessing intonation, recognizing speech, and detecting keywords that correspond to different moods. Other factors, such as level of engagement or participation, can be inferred from measuring duration and frequency of speaking, as well as eye gaze direction and head position analysis. These and other elements can be used to determine scores for different collaboration factors, which the video conferencing system can then use to alter the way the video conference is managed.

The system can perform a number of video conference management actions based on the collaboration factors determined from media streams. For example, the system can alter the way media streams are transmitted, for example, to add or remove media streams or to mute or unmute audio. In some instances, the size or resolution of video data is changed. In other instances, bandwidth of the conference is reduced by increasing a compression level, changing a compression codec, reducing a frame rate, or stopping transmission a media stream. The system can change various other parameters, including the number of media streams presented to different endpoints, changing an arrangement or layout with which media streams are presented, addition of or updating of status indicators, and so on. These changes can improve efficiency of the video conferencing system and improve collaboration among the participants.

As discussed herein, the video conferencing platform can use utilizes facial expression recognition technology, audio analysis technology, and timing systems, as well as neuroscience predictions, in order to facilitate the release of positive hormones, encouraging positive behavior in order to overcome barriers to successful collaboration. As a result, the technology can help create a collaborative environment where users can encourage one another to greater participation by users generally and less domination by specific users that detract from collaboration.

In one general aspect, a method of managing a video conference session involving multiple endpoint devices, the method comprising: receiving, by one or more computers, a media stream from each of multiple endpoint devices over a communication network; managing, by the one or more computers, a video conference session among the endpoint devices such that at least one or more of the media streams are transmitted over the communication network for display by the endpoint devices; measuring, by the one or more computers, a plurality of audio and/or video characteristics from the media stream from a particular endpoint device of the multiple endpoint devices; determining, by the one or more computers, based on the audio and/or video characteristics, a collaboration factor score for the particular endpoint device for each of a plurality of collaboration factors; selecting, by the one or more computers, from among a plurality of video conference management actions based on the collaboration factor scores for the media stream for the particular endpoint; and altering, by the one or more computers, the video conference of the multiple endpoints by performing the selected video conference management action.

In some implementations, the selected video conference management action comprises changing a size or resolution for the media stream for the particular endpoint; and wherein altering the management of the video conference session comprises changing a size or resolution at which the media stream for the particular endpoint is transmitted, or changing a size or resolution at which the media stream for the particular endpoint is presented by one or more of the multiple endpoints.

In some implementations, the selected video conference management action comprises reducing bandwidth of transmission of the media stream for the particular endpoint; and altering the management of the video conference session comprises reducing bandwidth of transmission of the media stream for the particular endpoint by increasing a compression level, changing a compression codec, reducing a frame rate, or stopping transmission of the media stream for the particular endpoint to one or more other endpoints.

In some implementations, the selected video conference management action comprises altering an audio volume level for the media stream for the particular endpoint; and altering the management of the video conference session comprises altering an audio volume level for the media stream for the particular endpoint by instructing a different volume level for the audio, muting the audio, or omitting the audio from the media stream for the particular endpoint transmitted to one or more other endpoints.

In some implementations, the method includes classifying, by the one or more computers, the media stream for the particular endpoint device based on the collaboration factor scores. The video conference management action is selected based on the classification of the media stream for the particular endpoint device.

In some implementations, classifying the media stream for the particular endpoint device comprises providing, to a trained machine learning classifier, the collaboration factor scores as inputs and receiving, as output of the trained machine learning classifier, one or more outputs indicative of likelihoods for one or more of a plurality of predetermined classifications, wherein the trained machine learning classifier comprises at least one of a neural network, a decision tree, a support vector machine, a logistic regression model, or a maximum entropy classifier.

In some implementations, classifying the media stream comprises assigning a classification from among a plurality of predetermined classifications each having an associated combination of collaboration factor scores or ranges, wherein the collaboration factors are indicative of different neurological and/or emotional attributes.

In some implementations, classifying the media stream comprises: determining a distance between (i) a set of collaboration factor scores for the particular endpoint, and (ii) each of multiple different combinations of collaboration factor scores or ranges that are each associated with a different classification; and selecting, as a classification for the media stream of the particular endpoint, the classification associated with the combination of collaboration factor scores or ranges having the lowest distance from the set of collaboration factor scores for the particular endpoint.

In some implementations, determining the scores for the plurality of collaboration factors comprises determining a score for each of a plurality of different neurological and/or emotional dimensions.

In some implementations, measuring the plurality of audio and/or video characteristics from the media stream from the particular endpoint device comprises identifying characteristics using speech recognition, facial expression recognition, gesture recognition, intonation analysis, eye gaze position analysis, head position analysis, and/or pattern analysis.

In some implementations, the method includes combining the scores for the collaboration factors into a composite score; and outputting, during the video conference session to one or more of the endpoint devices, data providing a representation of a participant corresponding to the particular endpoint, a representation of the composite score, and an output media stream from at least one of the endpoint devices.

In some implementations, the representation of the composite score comprises a symbol that changes in color according to a degree of quality and level of participation of a participant whose voice or image is indicated by the media stream for the particular endpoint, wherein the degree of quality and level of participation is indicated relative to degrees of quality and level of participation determined for participants corresponding to other endpoints involved in the video conference.

In some implementations, the method includes accessing data indicating multiple predetermined thresholds for the degree of quality and level of participation; and setting the color of the symbol based on the degree of quality and level of participation relative to the multiple predetermined thresholds, the one or more computers being configured to indicate a shade of red if the degree of quality and level of participation is determined to be in excess of a first predetermined threshold, a shade of orange if the measurement is determined to be between the first predetermined threshold and a second predetermined threshold, and a shade of green if the measurement is determined be below the second predetermined threshold.

In some implementations, the method includes: determining a group composite score based on collaboration factor scores determined from each of the media streams of the endpoint devices, the group composite score being indicative of a current level of collaboration and participation among participants in the video conference; and providing the group composite score to one or more of the endpoints over the communication network or using the group composite score to select the video conference management action.

In some implementations, measuring the plurality of audio and/or video characteristics from the media stream from the particular endpoint device comprises using facial expression recognition to determine estimate levels of at least one of attention, enthusiasm, happiness, sadness, stress, boredom, dominance, fear, anger, or deception.

In some implementations, measuring the plurality of audio and/or video characteristics from the media stream from the particular endpoint device comprises at least one of: determining a duration of speaking or participation time; detecting utterance of one or more keywords from a set of predetermined keywords; or identifying an intonation pattern.

In some implementations, the method includes: determining a composite score for each of the multiple endpoints based on the respective media streams for the endpoints, the composite scores indicating respective levels of participation or collaboration in the video conference; determining and outputting, in real-time during the video conference session, a representation of instructions to improve one or more of the composite scores indicating the lowest levels of participation or collaboration in the video conference; and periodically recalculating the composite scores for the multiple endpoints and altering the instructions based on the recalculated composite scores.

In some implementations, the one or more computers are configured to switch between enhancing the video conference in multiple different modes. The modes can include a passive public mode in which the one or more computers provide an output media stream display indicator for each of the multiple endpoints to each endpoint in the video conference. The modes can include a passive private mode in which the one or more computers (i) provide feedback based on composite scores for individual endpoints and/or for the overall collection of endpoints to a limited set of one or more devices having a predetermined permission level, and (ii) provide suggestions of moderator actions only to the limited set of one or more devices having a predetermined permission level. The modes can include an active mode in which the one or more computers introduce direct integrated audio and visual indicators and messages through the output media stream of one or more conference participants.

In another general aspect, a method of indicating in real-time the level and quality of participation of one or more participants within a multi-party video conference session by monitoring one or more party characteristics by way of audio and facial recognition is provided. Generally, the method comprises: in a preprocessor phase, measuring, with a processor, at least one facial and/or audio characteristic of an input media stream received from at least one conference party participant of a plurality of conference participants; (b) calculating, with the processor, a raw trait score from the at least one characteristic of the input media stream relating to neuro-emotional collaboration factors such as: stress, enthusiasm, contribution, and/or happiness, etc.; (c) in a moderator phase, combining the raw trait scores into an overall participant composite score and/or an overall group composite score; and (d) outputting in real-time, with the processor, an integrated representation of the at least one conference participant and the overall participant composite score and/or an overall group composite score, in combination, with an output media stream for at least one of the conference participants and/or a meeting organizer.

In some implementations, the preprocessor phase further comprises: the level and quality of participation of the conference participant is measured, by the processor, by way of facial recognition, by selecting or selecting in combination from the group of characteristics related to eye contact and facial expression indicating levels of attention, stress, boredom, dominance, fear, anger, and/or deception.

In some implementations, the preprocessor phase further comprises: the level and quality of participation of the conference participant is measured, by the process, by way of audio recognition, by selecting or in selecting in combination from the group of characteristics related to speaking/participation time, keyword recognition, and intonation.

In some implementations, the integrated representation includes a symbol indicative of the conference participant that changes in color according to the relative degree of quality and level of participation based on the measurement value as compared to the other plurality of participants.

In some implementations of the application, the symbol would indicate a shade of the color red if the measurement is determined to be in excess of a predetermined threshold, a shade of the color orange if the measurement is determined to be within an average predetermined threshold, or a shade of the color green if the measurement is determined be below a predetermined threshold.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
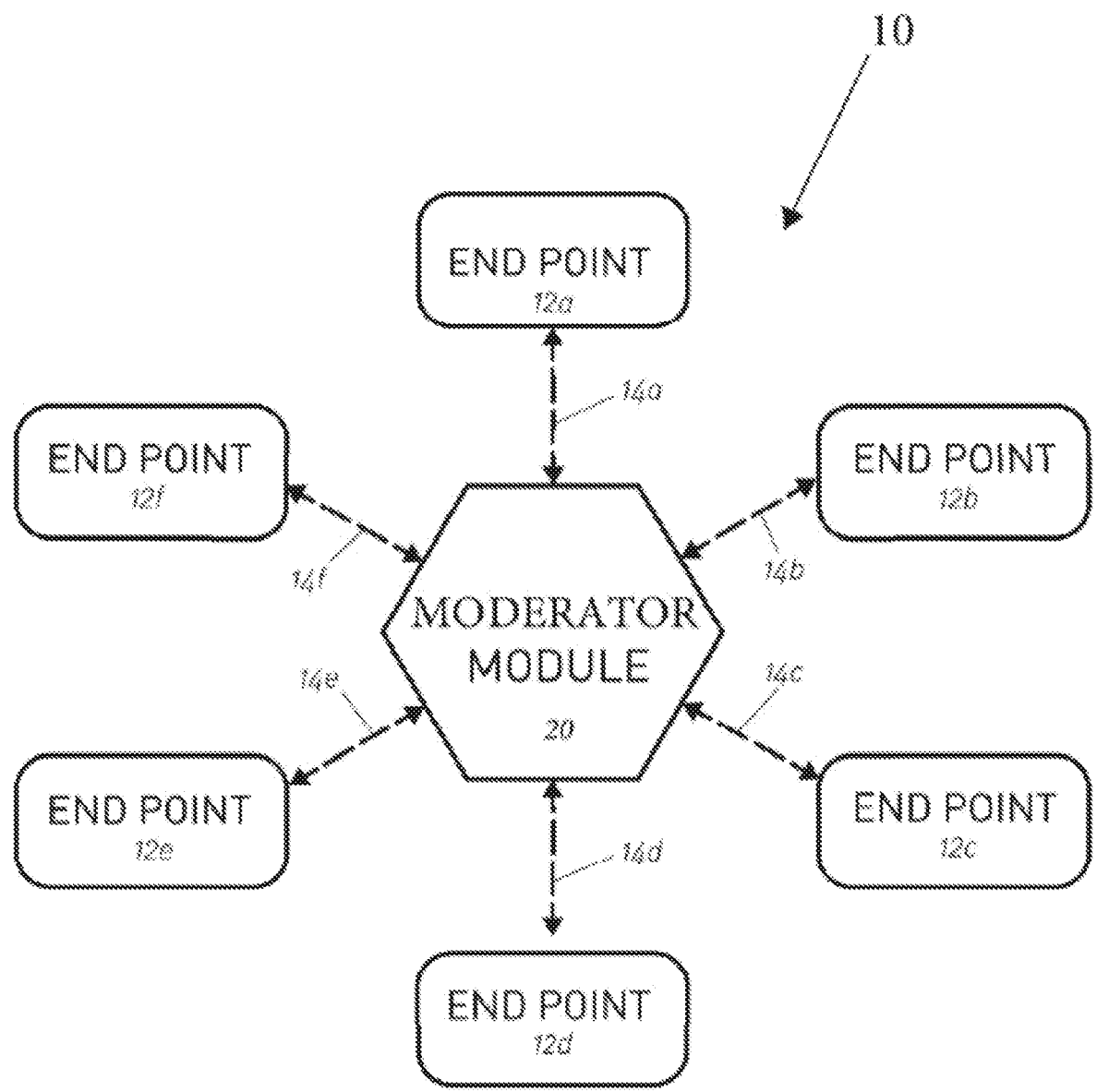
FIG. 1 is an example of a video conference moderator in communication with multiple endpoint media streams.

Various embodiments will be described in detail with reference to the drawings, wherein like reference numerals represent similar steps throughout the several views. Reference to various embodiments does not limit the scope of the claims attached hereto. Additionally, any examples set forth in this specification are not intended to be limiting and merely set forth some of the many possible implementations for the appended claims.

The present invention focuses on a video conference management system, including a moderator system indicating in real-time the level and quality of participation of one or more participants within a multi-party video conference session by monitoring one or more characteristics observable through a media stream in order to stimulate collaboration and active engagement during the video conference. The moderator emphasizes mitigating and overcoming barriers created by providing feedback and/or interjecting actions which facilitate group collaboration.

Moreover, the present application platform utilizes facial expression recognition and audio analysis technology as well as inferences based in neuroscience to prompt for efficient collaboration in a video conference setting. Beneficially, the techniques may facilitate the release of positive hormones, promoting positive behavior of each participant in order to overcome negative hormone barriers to successful collaboration.

In an example implementation, the participation of each endpoint conference participant is actively reviewed in real time by way of facial and audio recognition technology. A moderator module calculates a measurement value based on at least one characteristic evaluated by facial and audio recognition of at least one of the endpoint conference participants. The measurement value(s) can be used to represent—in real time—the quality and extent the participants have participated. Therefore, providing active feedback of the level and quality of the one or more conference participants, based on one or more monitored characteristics. Optionally, if certain thresholds are achieved or maintained, the system may trigger certain actions in order to facilitate engagement amongst the conference participants.

In some implementations, the video conference moderator system monitors, processes, and determines the level and quality of participation of each participant based on factors such as speaking time and the emotional elements of the participants based on facial expression recognition and audio feature recognition. In addition to monitoring speaking time of each participant, the video conference moderator may utilize facial recognition and other technology to dynamically monitor and track the emotional status and response of each participant in order to help measure and determine the level and quality of participation, which is output, in real time, as a representation (e.g., symbol, score, or other indicator) to a meeting organizer or person of authority and/or one or more of the conference participants. The representation may integrated with (e.g., overlaid on or inserted into) a media stream or a representation of an endpoint or the corresponding participant (e.g., a name, icon, image, etc. for the participant).

FIG. 1 illustrates an example of a video conference moderator system 10 incorporating a dynamic integrated representation of each participant. The moderator system 10 includes a moderator module 20 in communication with multiple conference participant endpoints 12a-f via communications path 14a-f. Each of the endpoints 12a-f communicates a source of audio and/or video and transmits a resulting media stream to the moderator module 20. The moderator module 20 receives the media stream from each of the endpoints 12a-f and outputs a combined and/or selected media stream output to the endpoints 12a-f. The endpoints 12a-f can be any appropriate type of communication device, such as a phone, a tablet computer, a laptop computer, a desktop computer, a navigation system, a media player, an entertainment device, and so on.

Figure 2A:
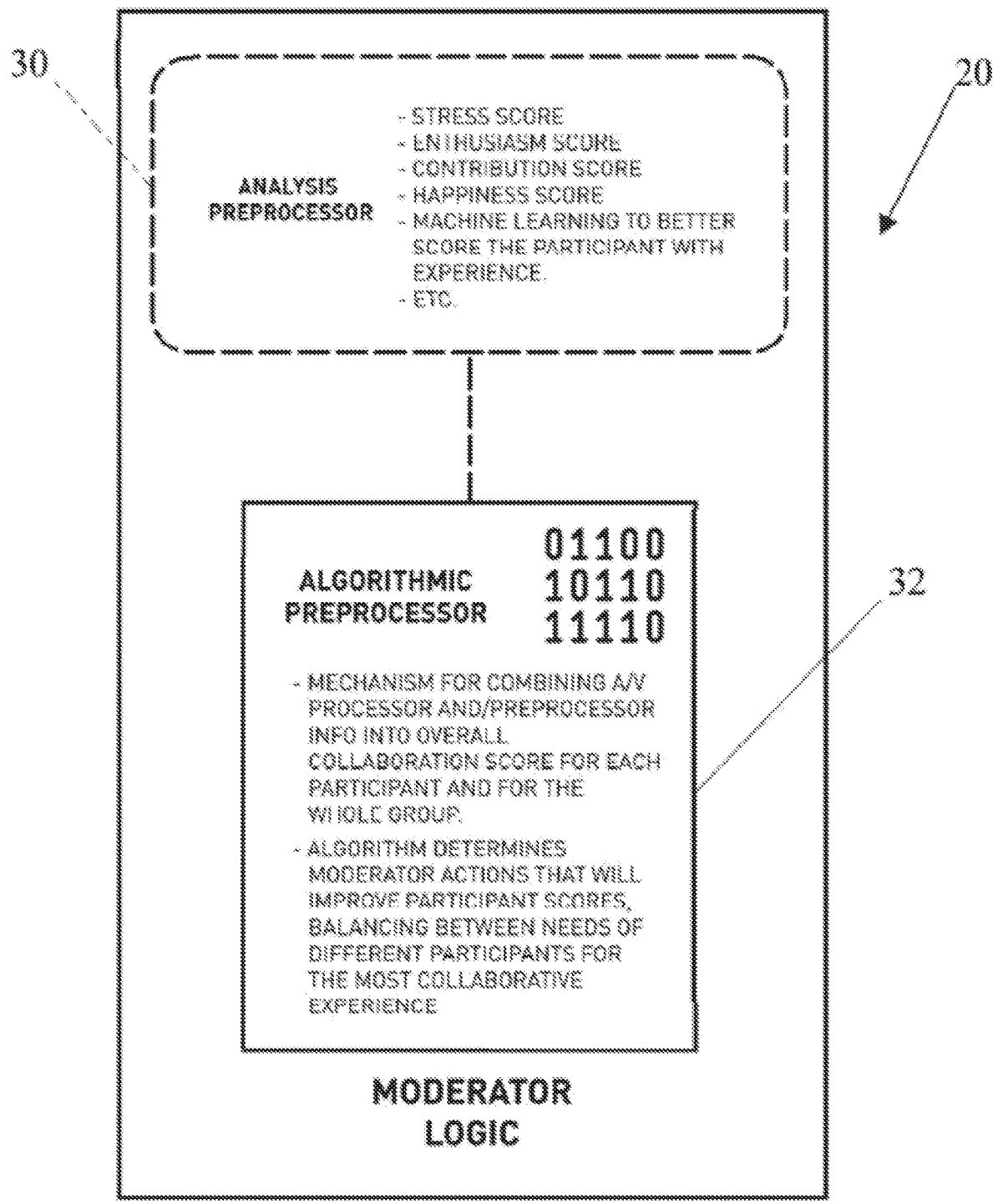
FIG. 2A is a block diagram illustrating an example moderator module.

In an example implementation shown in FIG. 2A, the moderator module 20 includes (i) an analysis preprocessor 30 which receives, analyzes, and determines raw scores (e.g., collaboration factor scores) based on monitored characteristics, and (ii) moderator logic 32 for combining raw scores into an overall collaborative or composite score and/or determine what action should take place to improve conference participant scores, balancing between needs of different participants for the most collaborative experience.

Figure 3:
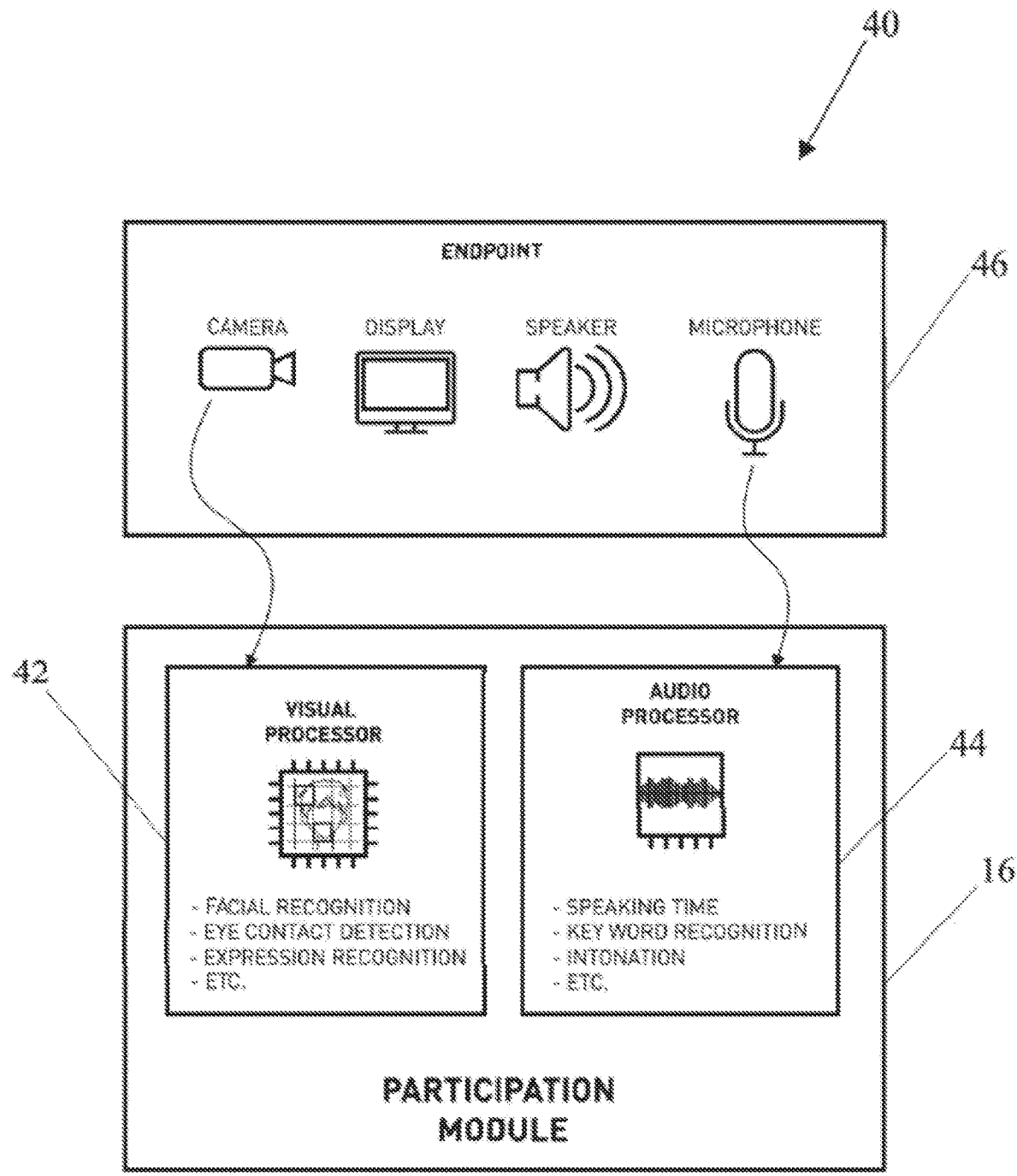
FIG. 3 is a block diagram illustrating an example participation module.

In some implementations of the video conference moderator system 10, the analysis preprocessor 30 can be separate from the moderator module 20, and the functions can be performed by one or more participation modules 40 (See FIG. 3). The participation modules 40 are configured to carry out the functions of the analysis preprocessor 30 utilizing one or more processors 42, 44. For example, the functions of image recognition, audio analysis, pattern recognition, and other functions may be distributed among the endpoints 12a-f so that each endpoint generates scores for its own video feed. This may provide for more accurate analysis, as each endpoint may have access to a richer dataset, greater historical information, and more device-specific and user-specific information than the moderator module 20.

Figure 2B:
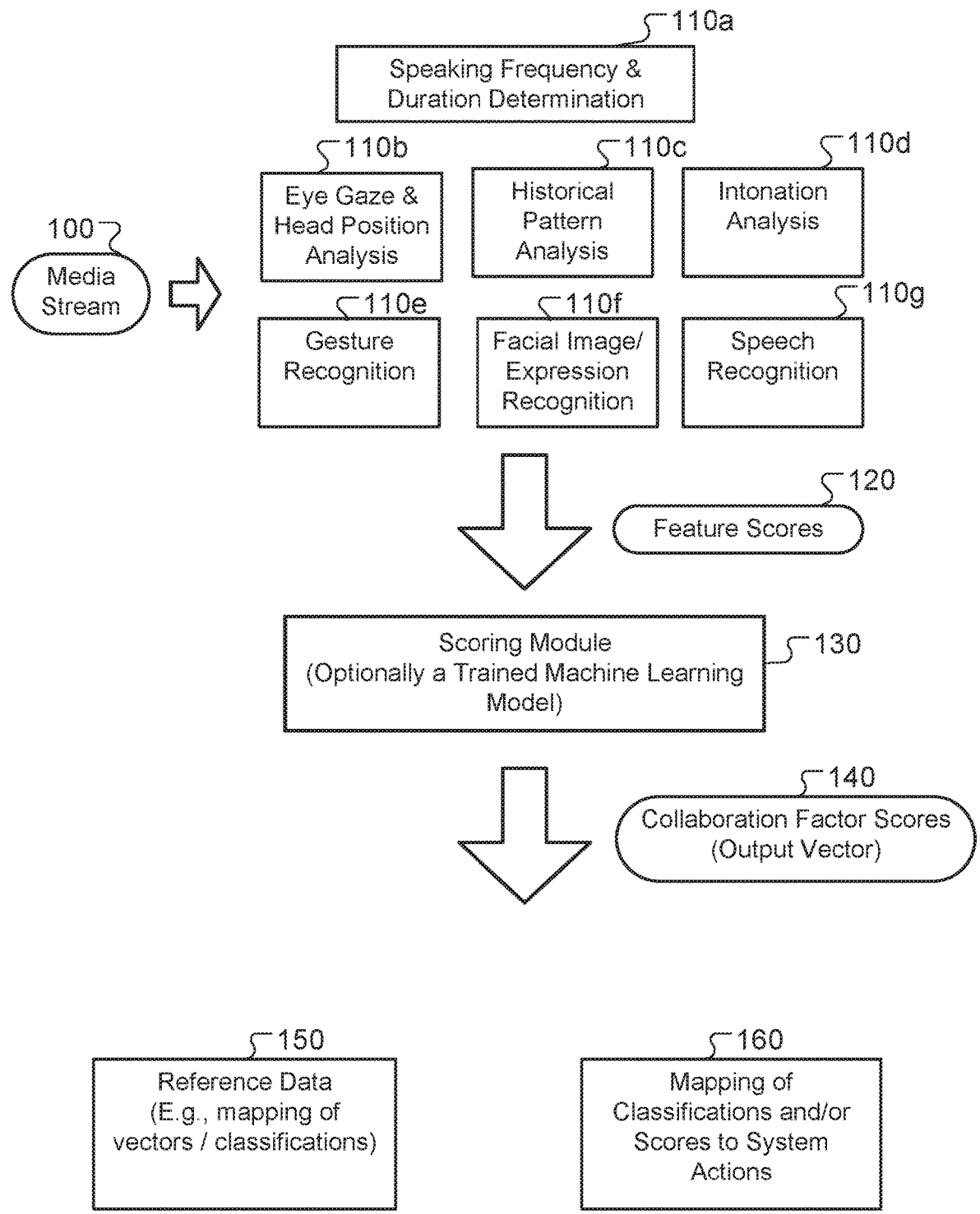
FIG. 2B is a block diagram illustrating an example of operations of the moderator module.

FIG. 2B illustrates an example of processing that can be performed by the moderator module 20. The moderator module 20 receives a media stream 100, which may include audio and/or video data, from a particular endpoint (e.g., representing audio and/or video uploaded by the endpoint, including the speech and/or image of the participant at the endpoint). The moderator module 20 then processes the video stream 100 using a number of different analysis techniques to assess the conditions of collaboration in the video conference and determine what management actions to take.

The moderator module 20 can use a number of analysis modules 110a-g to determine characteristics of the media stream. For example, these modules 110a-g can each determine feature scores 120 that reflect different attributes describing the media stream. For example, module 110a can determine a frequency and duration that the participant is speaking. Similarly, the module 110a can determine a frequency and duration that the participant is listening. The module 110b determines eye gaze direction of the participant and head position of the participant, allowing the module to determine a level of engagement of the participant at different times during the video conference. This information, with the information about when the user is speaking, can be used by the modules 110a, 110b to determine periods when the participant is actively listening (e.g., while looking toward the display showing the conference) and periods when the user is distracted and looking elsewhere. The module 110c performs pattern analysis to compare patterns of user speech and movement with prior patterns. The patterns used for comparison can be those of other participants in the current conference, patterns of the same participant in the same conference (e.g., to show whether and to what extent a user's attention and mood are changing), or general reference patterns known to represent certain attributes. The module 110d assesses intonation of speech of the participant, which can be indicative of different emotional states. The module 110a recognizes gestures and indicates when certain predetermined gestures are detected. The module 110f performs facial image or expression recognition, for example, indicating when a certain expression (such as a smile, frown, eyebrow raise, etc.) is detected. The module 110g performs speech recognition to determine words spoken by the participant. Optionally, the module 110g can determine whether any of a predetermined set of keywords have been spoken, and indicate the occurrence of those words as feature scores.

The feature scores 120 indicate the various temporal, acoustic, and image-based properties that the modules 110a-110g detect. The feature scores 120 are then used by one or more scoring modules 130 to determine collaboration factor scores 140 for each of multiple collaboration factors representing how well the participant has been participating or is disposed to participate in the future. In some implementations, the collaboration factors may represent how well a media stream is being transmitted or presented, such as an amount of network bandwidth used, a frequency or duration that a participant is speaking, a background noise level for audio or video data, a percentage of time a participant is looking toward the displayed video conference, etc. In some implementations, the collaboration factors may represent different emotional attributes, e.g., with a different score for levels of each of attention, enthusiasm, happiness, sadness, stress, boredom, dominance, fear, anger, or deception.

In some implementations, a single scoring module 130 determines each of the collaboration factor scores 140. In other implementations, multiple scoring modules 130 are used, for example, with each scoring module 130 determining a collaboration factor score for a different aspect or dimension of collaboration. The collaboration factor scores 140 may be expressed in a variety of ways, but one option is to for each score to be a value between 0 and 1 representing a level for a different aspect being assessed. The combination of scores can be expressed as a vector of values, e.g., [0.2, 0.4, 0.8, 0.5, 0.9, . . . ]. For example, one value may represent the degree to which the participant pictured in the media stream is inferred to be angry, another value may represent the degree to which the participant is inferred to be happy, and so on.

The scoring module 130 can optionally be a trained machine learning model which has been trained, based on a set of training data examples, to predict collaboration factor scores from feature score inputs. For example, the scoring module may include a neural network, a decision tree, a support vector machine, a logistic regression model, or other machine learning model.

As described above, the different collaboration factor scores 140 can be combined into a composite score representing an overall level of participation, engagement, and collaborative potential for the participant. This may be done using a function, a weighted average, a trained machine learning model, or another appropriate technique.

The collaboration factor scores 140 output by the scoring module 130, optionally expressed as a vector, can be compared with reference data (e.g., reference vectors) representing combinations of collaboration factor scores (or combinations of ranges of collaboration factor scores) that are associated with different classifications. For example, one combination of scores may represent a condition that promotes collaboration, while another combination of scores may represent a condition that detracts from collaboration. The moderator module 20 can store and then later access reference data 150 that sets forth predetermined combinations of collaboration factor scores or ranges and corresponding classifications. The moderator module 20 can also determine the similarity between the vector of collaboration factor scores 140 for the current participant at the current time relative to the different reference vectors, e.g., by determining cosine distances between the current vector and each reference vector. The moderator module 20 may then determine the reference vector that is closest to the current vector of collaboration factor scores 140, and select the classification associated with that reference vector in the reference data 150 as a classification for the current participant.

The moderator module 20 can also store and access mapping data 160 that indicates video conference management actions to be performed, either directly by the moderator module 20 or suggested for a user (e.g., a meeting organizer) to perform. For example, the mapping data 160 can indicate classifications and corresponding actions that the moderator module 20 can take to improve the video conference session when the corresponding classification is present. The actions may affect the current endpoint and the corresponding participant. In addition, or as an alternative, the actions may affect and may be based on the scores and classifications of other participants in the video conference. Thus, an action that affects one endpoint or participant may taken in response to evaluating the various scores or classifications for one or more, or even all, of the other endpoints and participants.

The moderator module 20 can perform a number of actions to alter the transmission and/or presentation of the video conference at the various endpoints 12a-f. The actions can enhance the quality of the conference and provide a variety of improvements to the functioning of the system. For example, the moderator module 20 can adjust audio properties for the different endpoints 12a-f. Depending on the collaboration factor scores and/or classification determined, the moderator module 20 can alter the transmission of data and/or presentation of the video conference at the endpoints 12a-f. For example, the moderator module 20 can add or remove a media stream from being provided, change a number or layout of media streams presented, change a size or resolution of a video stream, change a volume level or mute audio of one or more participants, designate a particular participant as speaker or presenter, set period or time limits that a particular participant can be a speaker or presenter to the group, and so on. The moderator module 20 can also improve efficiency of conferencing by, for example, reducing a bit rate of a media stream, changing a codec of a media stream, changing a frame rate of a media stream, and so on. As discussed further below, the moderator module 20 can additionally or alternatively add a score, indicator, symbol, or other visible or audible feature that represents the composite collaboration score for individual participants or for the group of participants as a whole.

In some implementations, the functions shown for FIG. 2B are performed for each endpoint 12a-f in the videoconference. The functions discussed can also be performed repeatedly, for example, on an ongoing basis at a particular interval, such as every second, every 5 seconds, every minute, etc. This can allow the moderator module 20 to adapt to changing circumstances in the videoconference. The moderator module 20 can re-classify different endpoints 12a-f and their video streams to take different actions, thus dynamically altering how video and audio information is transmitted and presented for the endpoints 12*a-f*.

As shown in FIG. 3, each participation module 40 is configured to provide at least an input interface 46 configured to receive media by way of video and/or audio of each requisite one or more conference participants endpoints 12*a-f*. Typically, the participation modules 40 are configured to operate on each participant endpoints 12*a-f* existing computer hardware and/or processing means including the utilization of input and output interfaces, for example a video camera or webcam, video displays, microphones, and/or audio speakers.

Figure 4:
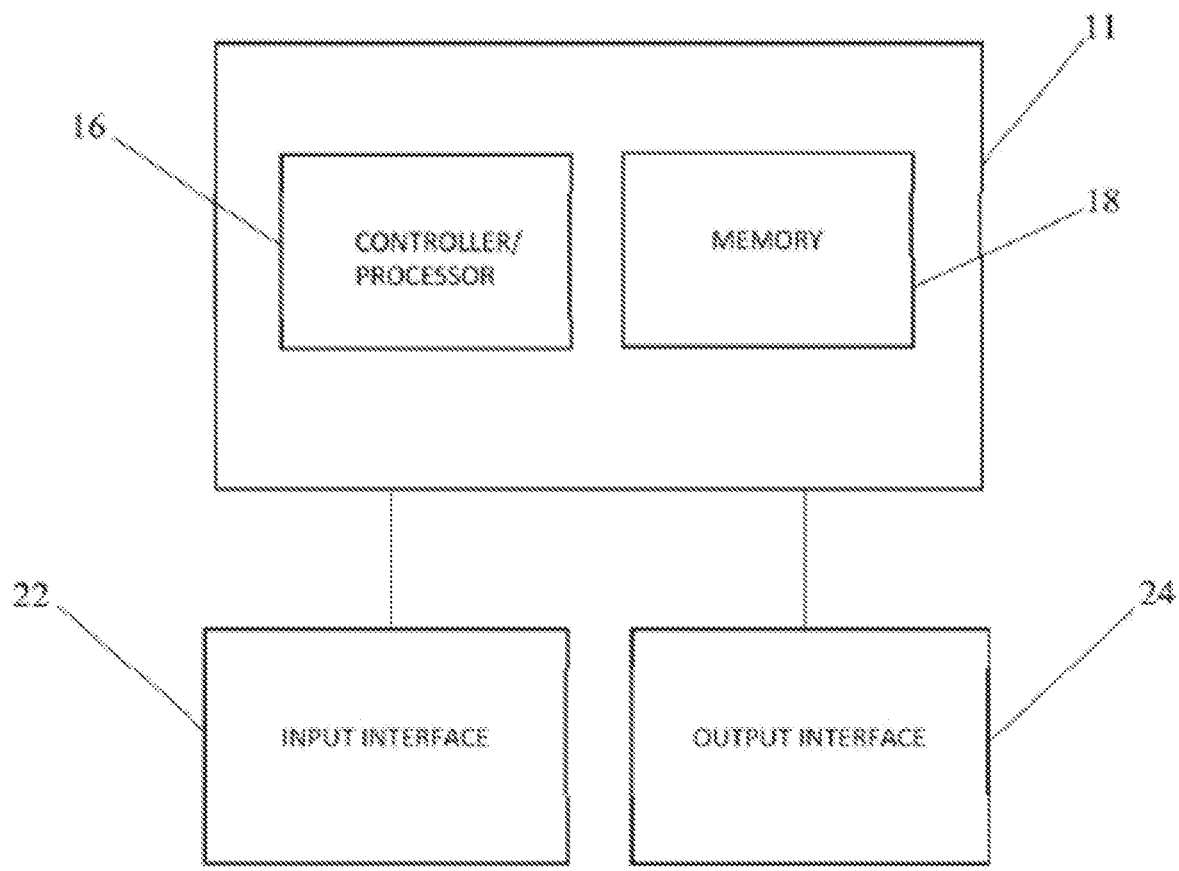
FIG. 4 is a block diagram illustrating a computer processing system in components in accordance with an element of the invention.

FIG. 4 is an example computer hardware and processing means that may be utilized for supporting operation of the processing of one or more of the calculations throughout the video conference moderator system 10 such as the moderator module 20 and/or each of the one or more independent participation modules in components. Generally, the processing components may comprise one or more processors 16, a memory 18, and a communication interface, including an input interface 22 and an output interface 24. The input interface 22 configured to receive one or more media stream content comprised of audio and/or visual characteristics from one or more conference participant endpoints 12*a-f*. The one or more processors 16 are generally configured to calculate at least one measurement value indicative of a participation level based on one or more characteristics from the media stream at any given moment or over a period of time. The output interface 24 transmits at least one integrated representation of the measurement value to one or more conference participant endpoints 12*a-f*, which will be described in more detail below.

Referring to FIG. 2 and FIG. 3, the analysis preprocessor 30 is operably configured to receive and measure raw scores (e.g., collaboration factor scores) of monitored characteristics throughout a video/audio conference call via the input media streams. The score value indicative of a level of participation or other characteristic may be calculated by the processor 16 or other processing means for each of the conference participant endpoints 12*a-f*.

In some implementations of the video conference moderator system 10, the analysis processor 30 is configured to derive a raw score for each participant endpoint 12*a-f* for each displayed characteristic relating to each participant's visual and audio media stream input 46. Specifically, a score is derived for one or more of the following traits: stress, enthusiasm, contribution, and/or happiness among others based on visual and audio cues detected throughout the media stream input 46 at any given time or over time. The raw measurement scores for each characteristic of each conference participant are detected by way of facial expression recognition and/or audio recognition technology based on principles of neuroscience.

For example, throughout the analysis processor 30, the audio input media stream is analyzed by audio recognition technology in order to detect individual speaking/participation time, keyword recognition, and intonation and tone which indicate certain characteristics of each participants collaborative status. Moreover, individually or in aggregate with the audio recognition technology, the facial recognition technology is configured to monitor and detect varying facial expression at any given moment or over a period of time, which indicate participant's emotional status relating to attentiveness, contentment, patience, stress, boredom, dominance, fear, anger, and/or deception throughout the duration of the conference call. These characteristics are analyzed to provide one or more of the raw trait scores relating to the participants traits: stress level, enthusiasm, contribution, and happiness, among others.

In some implementations, the monitored characteristics may either negatively or positively impact the trait scores of each participant. For example, a negative impact of one or more of the raw trait score may be based on an endpoint conference participant who is exhibiting negative emotions such as stress, boredom, dominance, fear, deception, and/or even anger. Oppositely, a positive impact of one or more of the raw trait score may be based on a conference participant who is exhibiting positive, collaborative emotions such as facial expression related to characteristics of attentiveness, genuine, contentment, pleasure, and patience when others are speaking.

The time period utilized in the above calculations may be any predetermined amount of time, a percentage of the total conference time, or the total conference time. Moreover, derivation of the raw score traits may be a measure of the relative raw score traits of a particular conference participant compared with the other conference participant endpoints.

The analysis processor 30 may be configured to actively and intelligently learn how to best and most effectively score each participant throughout the conference call and over a series of conference calls with the same participants.

Figure 7:
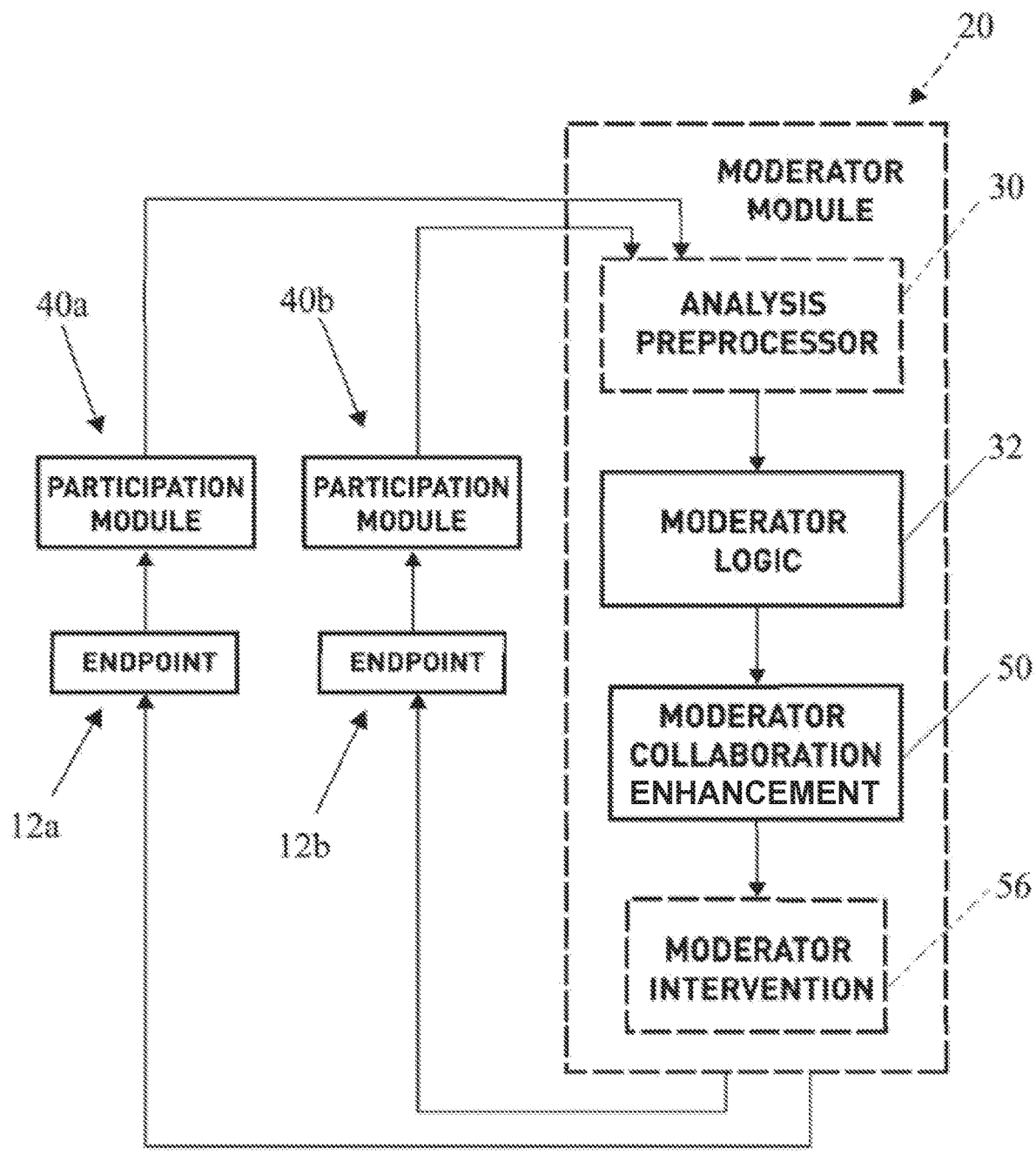
FIG. 7 illustrates a flow chart of one implementation of a method employed by the application.
Figure 8:
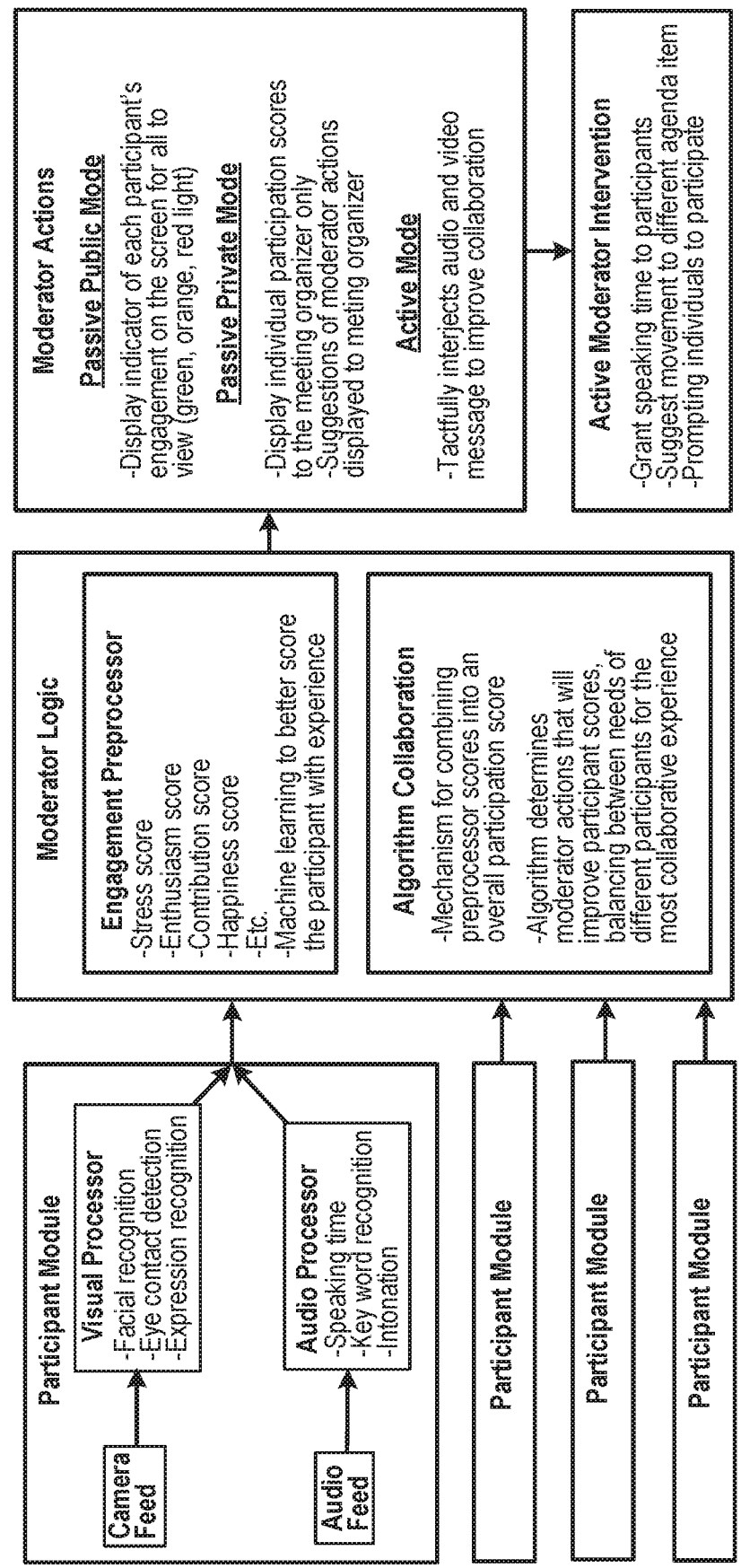
FIG. 8 illustrates an overview flowchart of another implementation of a method employed by the current application.

Now referring to FIG. 2, FIG. 7, and FIG. 8, the moderator logic 32 is operably configured to combine the raw scores derived in the analysis preprocessor 30 into an overall participant composite score and/or an overall group composite score. Moreover, the moderator logic 32 may be configured to determine and provide instructions on what action should take place to improve the conference participant composite scores, balancing between the needs of different participants for the most collaborative experience.

In some implementations, the moderator logic 32 combines the raw trait scores derived in the analysis processor 32 above relating to stress, enthusiasm, contribution, and happiness of each participant into an overall participant composite score and group composite score. The composite score may be a selective combination of one or more of the raw trait scores. Each raw trait score may be equally or differently weighted depending on the overall group composite score and/or scenario. Varying equations/algorithms calculating the outcome value of the one or more composite scores can be envisioned, including but not limited to clustering, neural networks, and nonlinear models. Rather than an equation, the score may also be implemented as a direct sum quantity for each individual participant.

Figure 5:
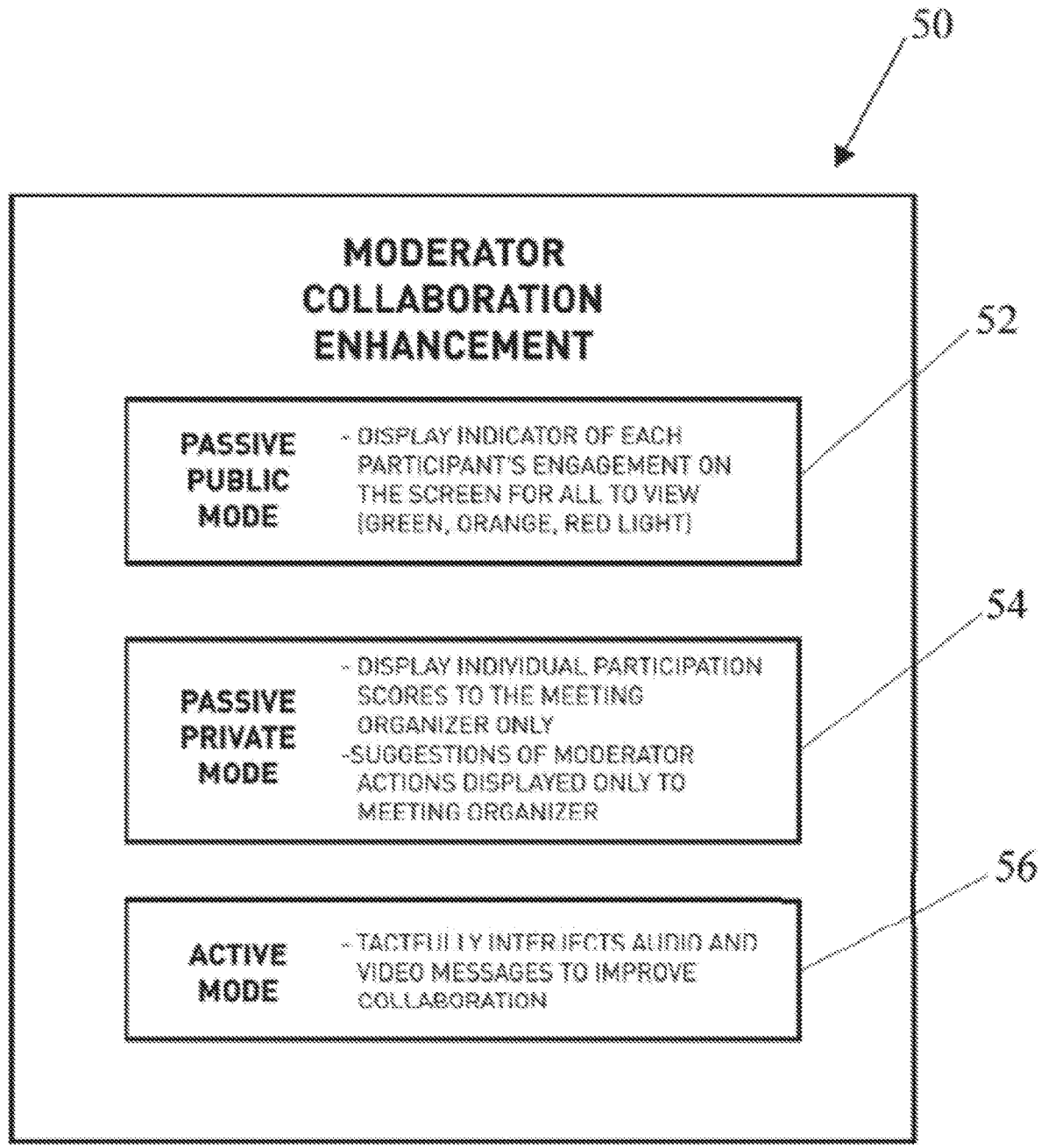
FIG. 5 is a block diagram illustrating a plurality of example moderator modes for enhancing collaboration.
Figure 6:
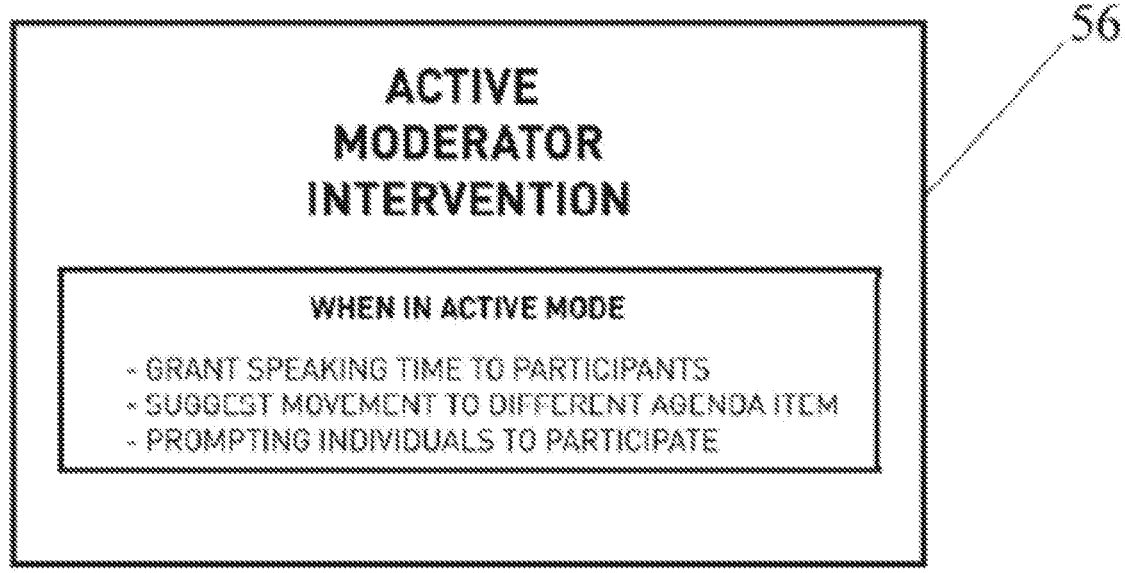
FIG. 6 is a block diagram illustrating the active moderator mode of the implementation of FIG. 5.

The moderator logic 32 may also include the function of determining and providing instructions regarding what action or course of action should take place in order to improve the conference participant composite scores, with emphasis on balancing the needs between the different participants in order to facilitate the most collaborative experience. Referring to FIG. 5, FIG. 7, and FIG. 8. In some implementations of the invention, the moderator logic 32 may provide one or more moderator collaboration enhancement modes 50 ('MCE modes'), each designed to interact with conference participant endpoints 12*a-/*in order to encourage proactive collaboration amongst the participants based off the participant composite scores and/or the overall group composite score. The MCE modes may be selected from the following group: Passive Public Mode 52, Passive Private Mode 54, and/or Active Mode 56. Each mode actively provides the group organizer different ways of providing direct feedback and/or actions to prompt and facilitate collaboration.

More specifically, the Passive Public Mode 52 provides an integrated output media stream display indicator of each participant's engagement publishing to the group each participants composite score and/or the group's overall composite score. In some implementations of the invention, the indicator is an integrated representation using a multi-color coded dynamic participation level and quality indicator of each conference participant endpoint 12a-f. The indicator conveys the participation level of the participant endpoints 12a-f through the output video stream of the respective participant endpoints 12a-f. In the illustrated implementation, the integrated representation dynamic participation level and quality indicator changes in color according to the relative degree of the quality and level of participation based on the participant composite score as compared to the other plurality of participants or compared with a predetermined quantity or threshold. For example, the indicator may indicate a shade of the color red if the composite score is determined to be in excess of a predetermined threshold based on the quality and level of participation, a shade of the color orange if the composite score is determined to be within an average predetermined threshold, or a shade of the color green if the composite score is determined be below a predetermined threshold. Thus, providing each of the conference participant endpoints 12a-f with a dynamic indicator exposing each participant's quality and level of participation. Therefore, individually, collectively, and via social influence/pressure encouraging the group to efficiently collaborate.

The MCE modes 50 may also include a Passive Private Mode 54 which limits feedback based on the participant composite scores and/or overall group composite scores only to the group/meeting organizers who have permission. Moreover, the Passive Private Mode 54 may also provide suggestions of moderator actions directed and displayed only to the group/meeting organizer in order to introduce actions that promote a positive outcome towards group collaboration-improving individual participant composite scores and overall group composite scores.

The MCE modes 50 may also further comprise an Active Mode 56 which tactfully interjects and/or subtly introduces direct integrated audio and visual indicators and messages through the output video stream of one or more conference participants, which are configured to improve collaboration individually and as a group.

The operations of the moderator module 20 can enhance collaboration by recognizing and signaling negative conditions or states that hinder collaboration. In many cases, these conditions are conditions of the participants of the video conference that can be detected in the media streams provided to the moderator module 20. Collaborative group members typically come from different backgrounds, embrace alternative beliefs, and view the world much differently from one another; namely, have different views and interests on how or even if an objective should be effected or achieved. Collectively, this provides a diverse and sometimes hostile collaborative video conferencing environment, which is not ideal for an efficient group analysis and resolution of an objective that everyone can cooperatively agree on.

In many situations, stress hormones such as norepinephrine, cortisol, and adrenaline inhibit group members from participating and successfully collaborating towards a common objective. Stress hormones increase blood flow to skeletal muscles, intensifies breathing and heart rate, dilates pupils, and elevates blood pressure. The moderator module 20 may detect these physiological changes, for example, though analysis of video data provided during the video conference. There are positive implications of these hormones in protecting and energizing humans. But as they relate to resolving issues with regard to collaboration, these are generally chemicals that will hinder the positive outcomes. These hormones create resistance to resolving difficulties, making decision, compromising, and arriving at mutually productive conclusions, or even building relationship bonds.

On the other hand, dopamine, oxytocin, serotonin, endorphins, and anandamide are major hormones associated with success, contentment, pleasure, and bonding. These can encourage group participation, individual buy in, and collaboration, which promotes efficiently working as a group to achieve a common objective. The brain and glands are very resistant in releasing these potent drugs, since the reward system would not be functional or effective if "rewards" were granted arbitrarily or continually.

Current video conference platforms do not facilitate the release of positive hormones while mitigating the release of negative hormones. The techniques employed by the moderator module 20 can manage a video conference to encourage a collaborative, efficient work setting, for example, by improving the efficiency of collaborating, overcoming resistance towards participation and collaboration, and overcoming barriers created by the release of negative neurological hormones.

The video conference moderator module 20 utilizes both tangible technology and the science of neurology to secure necessary chemical assistance of oxytocin, dopamine, and serotonin, while subduing adrenaline, cortisol, and other negative neurological hormones throughout a video conference call. The platform is configured to promote positive thought patterns and outcomes, to help overcome negative emotional states among the video conference group collaborators by mitigating and overcoming barriers created by negative neurological hormones while encouraging the release of positive hormones throughout the meeting.

FIG. 7 illustrates a flow chart of an implementation of the video conferencing moderator system 10. The participation module 40 monitors, measures and analyzes one or more characteristic of an input media stream by way of facial and audio recognition technology from at least one conference participant endpoint of a plurality of conference participants endpoints 12a. The analysis preprocessor 30 calculates/derives a raw trait score from the characteristic of the media stream including but not limited to one or more of the following traits: stress, enthusiasm, contribution, and happiness. The moderator logic 32 combines the raw trait scores derived in the analysis processor 30 relating to stress, enthusiasm, contribution, and happiness of each participant into an overall participant composite score and group composite score. Thereafter, the moderator logic 32 outputs an integrated moderator collaboration enhancement action 50 based on at least one of the conference participant endpoints 12 composite score via the output media stream.

The integrated moderator collaboration enhancement action 50 may be displayed by one or more of the endpoints 12a-f. The moderator module 10 may be a video conferencing bridge or an audio conferencing bridge, either of which may be referred to as a multipoint conferencing unit (MCUs).

The memory 18 may be any known type of volatile memory or non-volatile memory. The memory 18 may store computer executable instructions. The processor 16 may execute computer executable instructions. The computer executable instructions may be included in the computer code. The computer code may be stored in the memory 18. The computer code may be logic encoded in one or more tangible media or one or more non-transitory tangible media for execution by the processor 16.

The computer code may be logic encoded in one or more tangible media or one or more non-transitory tangible media for execution by the processor 16. Logic encoded in one or more tangible media for execution may be defined as instructions that are executable by the processor 16 and that are provided on the computer-readable storage media, memories, or a combination thereof.

Instructions for instructing a network device may be stored on any logic. As used herein, "logic" includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

The instructions may be stored on any computer readable medium. A computer readable medium may include, but is not limited to, a hard disk, an application-specific integrated circuit (ASIC), a compact disk CD, other optical medium, a random access memory (RAM), a read-only memory (ROM), a memory chip or card, a memory stick, and other media from which a computer, a processor or other electronic device can read.

The one or more processors 16 may include a general processor, digital signal processor, application-specific integrated circuit, field programmable gate array, analog circuit, digital circuit, server processor, combinations thereof, or other now known or later developed processors. The processor 16 may be a single device or combinations of devices, such as associated with a network or distributed processing. Any of various processing strategies may be used, such as multi-processing, multi-tasking, parallel processing, remote processing, centralized processing or the like. The processor 16 may be responsive to or operable to execute instructions stored as part of software, hardware, integrated circuits, firmware, microcode or the like. The functions, acts, methods or tasks illustrated in the figures or described herein may be performed by the processor 16 executing instructions stored in the memory 18. The functions, acts, methods or tasks are independent of the particular type of instructions set, storage media, processor or processing strategy and may be performed by software, bard ware, integrated circuits, firmware, micro-code and the like, operating alone or in combination. The instructions are for implementing the processes, techniques, methods, or acts described herein.

The input/output interface(s) may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other or through one or more intermediate entities (e.g., processor, operating system, logic, software). Logical and/or physical communication channels may be used to create an operable connection.

The communication paths $14a$-$f$ may be any protocol or physical connection that is used to couple a server to a computer. The communication paths $14a$-/may utilize Ethernet, wireless, transmission control protocol (TCP), internet protocol (IP), or multiprotocol label switching (MPLS) technologies.

The endpoints $12a$-$f$ may include a processor, a memory, and a communication interface according to the examples discussed above. In addition, the endpoints $12a$-$f$ include a display and at least one input device. The display may be a cathode ray tube (CRT) monitor, a liquid crystal display (LCD) panel, or another type of display. The input device may include a camera, a microphone, a keyboard, and/or a mouse. The endpoints $12a$-$f$ are capable of producing a media stream, including video and/or audio, that originates with the camera and/or microphone and is compressed and encoded by the processor or codecs. The endpoints $12a$-$f$ may also include one or more speakers.

It shall be known that all the advantageous features and/or advantages do not need to be incorporated into every implementation of the invention.

Although several example implementations of the invention have been described in detail, other implementations of the invention are possible.

All the features disclosed in this specification (including and accompanying claims, abstract, and drawings) may be replaced by alternative features serving the same, equivalent or similar purpose unless expressly stated otherwise. Thus, unless stated otherwise, each feature disclosed is one example only of a generic series of equivalent or similar features.

A number of implementations have been described. Nevertheless, various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:
   receiving, by one or more computers, video data of a media stream generated by a particular endpoint device involved in an online collaboration session involving multiple endpoint devices;
   generating, by the one or more computers, one or more scores for the media stream based analysis of the video data of the media stream, wherein the one or more scores are based on at least one of facial image analysis or facial video analysis, the one or more scores comprising at least one of a neurological attribute score or an emotional attribute score;
   determining, by the one or more computers, an engagement score for the particular endpoint device, wherein the engagement score is based on at least one of (i) a neurological attribute indicated by the one or more scores for the media stream or (ii) an emotional attribute indicated by the one or more scores for the media stream; and providing, by the one or more computers, output comprising at least one of (i) an indication of the engagement score for display, or (ii) an instruction to alter the online collaboration session by performing a management action selected based on the engagement score.

2. The method of claim 1, wherein the output comprises the instruction to alter the online collaboration session;
wherein the selected management action comprises changing a size or resolution for the media stream for the particular endpoint; and
wherein the instruction comprises an instruction to change at least one of (i) a size or resolution at which the media stream for the particular endpoint is transmitted, or (ii) a size or resolution at which the media stream for the particular endpoint is presented by one or more of the multiple endpoints.

3. The method of claim 1, wherein the output comprises the instruction to alter the online collaboration session;
wherein the selected management action comprises reducing a bandwidth of transmission of the media stream for the particular endpoint; and
wherein the instruction comprises an instruction to reduce bandwidth of transmission of the media stream for the particular endpoint by performing at least one of increasing a compression level, changing a compression codec, reducing a frame rate, or stopping transmission of the media stream for the particular endpoint to one or more other endpoints.

4. The method of claim 1, wherein determining the engagement score comprises classifying, by the one or more computers, the media stream for the particular endpoint device based on the one or more scores.

5. The method of claim 4, wherein classifying the media stream for the particular endpoint device comprises:
providing, to a trained machine learning classifier, the one or more scores as inputs and receiving, as output of the trained machine learning classifier, one or more outputs indicative of likelihoods for one or more of a plurality of predetermined classifications, wherein the trained machine learning classifier comprises at least one of a neural network, a decision tree, a support vector machine, a logistic regression model, or a maximum entropy classifier.

6. The method of claim 1, comprising assigning a classification from among a plurality of predetermined classifications each having an associated combination of scores or score ranges.

7. The method of claim 6, wherein classifying the media stream comprises:
determining a distance between (i) a set of collaboration factor scores for the particular endpoint, and (ii) each of multiple different combinations of collaboration factor scores or ranges that are each associated with a different classification; and
selecting, as a classification for the media stream of the particular endpoint, the classification associated with a combination of collaboration factor scores or ranges having the lowest distance from the set of collaboration factor scores for the particular endpoint.

8. The method of claim 1, wherein determining the one or more scores comprises determining a score for each of a plurality of different neurological and/or emotional dimensions.

9. The method of claim 1, wherein the one or more scores are based on characteristics determined using speech recognition, facial expression recognition, gesture recognition, intonation analysis, eye gaze position analysis, head position analysis, and/or pattern analysis.

10. The method of claim 1, wherein providing the output comprise outputting, during the online collaboration session to one or more of the endpoint devices, the indication of the engagement score for display by one or more of the endpoint devices.

11. The method of claim 1, wherein the output includes the indication of the engagement score, wherein the indication of the engagement score comprises a symbol that changes in color according to a degree of quality and level of participation of a participant whose voice or image is indicated by the media stream for the particular endpoint.

12. The method of claim 11, comprising:
accessing data indicating multiple predetermined thresholds for the degree of quality and level of participation; and
setting the color of the symbol based on the degree of quality and level of participation relative to the multiple predetermined thresholds.

13. The method of claim 1, comprising:
determining a group composite score based on scores determined for media streams of multiple of the endpoint devices, the group composite score being indicative of a current level of collaboration and participation among participants in the online collaboration session; and
providing the group composite score to one or more of the endpoints over a communication network or using the group composite score to select the management action.

14. The method of claim 1, wherein the one or more scores are generated using facial expression recognition to estimate a level of at least one of attention, enthusiasm, happiness, sadness, stress, boredom, dominance, fear, anger, or deception.

15. The method of claim 1, wherein the one or more scores for the media stream based analysis of the video data of the media stream includes generating the one or more scores using a machine learning model.

16. The method of claim 15, wherein generating the one or more scores comprise:
determining feature scores for the video data using one or more analysis modules, wherein one or more of the analysis modules is configured to perform facial image analysis or facial video analysis; and
providing the feature scores as input to the machine learning model;
wherein generating the one or more scores comprises generating the one or more scores based on output the machine learning model provided in response to receiving the feature scores.

17. The method of claim 1, wherein the one or more scores are further based on audio characteristics of the media stream.

18. The method of claim 1, wherein the output comprises the instruction to alter the online collaboration session; and
wherein the selected management action comprises setting a time limit in the online collaboration session for the particular endpoint device based on the engagement score.

19. A system comprising:
one or more computers; and
one or more computer-readable storage devices storing instructions that, when executed by the one or more computers, cause the one or more computers to perform operations comprising:
receiving, by one or more computers, video data of a media stream generated by a particular endpoint device involved in an online collaboration session involving multiple endpoint devices;
generating, by the one or more computers, one or more scores for the media stream based analysis of the video data of the media stream, wherein the one or more scores are based on at least one of facial image analysis or facial video analysis, the one or more scores comprising at least one of a neurological attribute score or an emotional attribute score;
determining, by the one or more computers, an engagement score for the particular endpoint device, wherein the engagement score is based on at least one of (i) a neurological attribute indicated by the one or more scores for the media stream or (ii) an emotional attribute indicated by the one or more scores for the media stream; and
providing, by the one or more computers, output comprising at least one of (i) an indication of the engagement score for display, or (ii) an instruction to alter the online collaboration session for the multiple endpoints by performing a management action selected based on the engagement score.

20. One or more non-transitory computer-readable storage devices storing instructions that, when executed by one or more computers, cause the one or more computers to perform operations comprising:
receiving, by one or more computers, video data of a media stream generated by a particular endpoint device involved in an online collaboration session involving multiple endpoint devices;
generating, by the one or more computers, one or more scores for the media stream based analysis of the video data of the media stream, wherein the one or more scores are based on at least one of facial image analysis or facial video analysis, the one or more scores comprising at least one of a neurological attribute score or an emotional attribute score;
determining, by the one or more computers, an engagement score for the particular endpoint device, wherein the engagement score is based on at least one of (i) a neurological attribute indicated by the one or more scores for the media stream or (ii) an emotional attribute indicated by the one or more scores for the media stream; and
providing, by the one or more computers, output comprising at least one of (i) an indication of the engagement score for display, or (ii) an instruction to alter the online collaboration session for the multiple endpoints by performing a management action selected based on the engagement score.

* * * * *